(No Model.)

A. N. JEWETT.
INCUBATOR.

No. 509,035. Patented Nov. 21, 1893.

Witnesses
A. Ruppert
R. L. Dutton

Inventor:
Amos N. Jewett
Per
Thomas P. Simpson
Atty

UNITED STATES PATENT OFFICE.

AMOS N. JEWETT, OF OSSAWATOMIE, KANSAS.

INCUBATOR.

SPECIFICATION forming part of Letters Patent No. 509,035, dated November 21, 1893.

Application filed February 21, 1893. Serial No. 463,145. (No model.)

*To all whom it may concern:*

Be it known that I, AMOS N. JEWETT, a citizen of the United States, residing at Ossawatomie, in the county of Miami and State of Kansas, have invented certain new and useful Improvements in Incubators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make an incubator where the eggs may all be seen from the outside, the air kept moist without the use of pans, the eggs turned without opening the incubator, and the heater arranged so that the heat may be utilized to as great an extent as possible.

Figure 1:
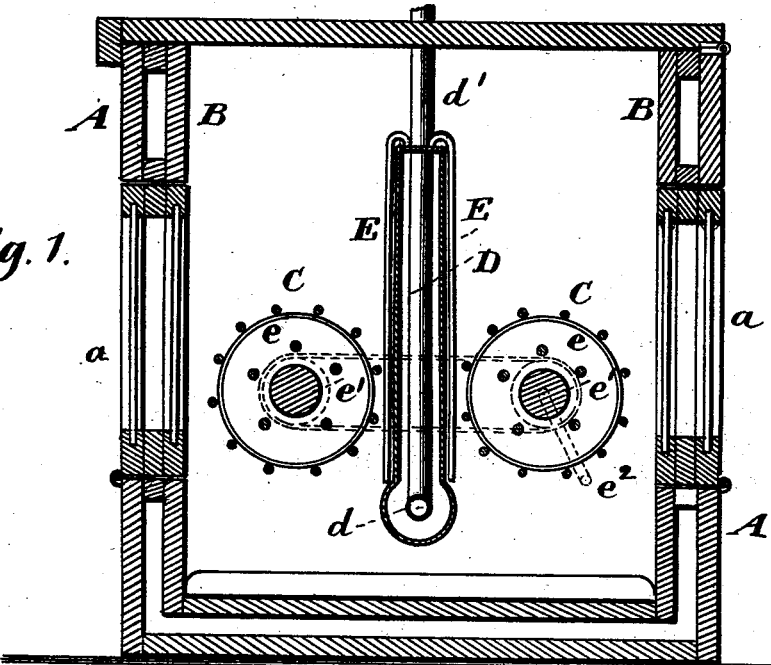
Figure 2:
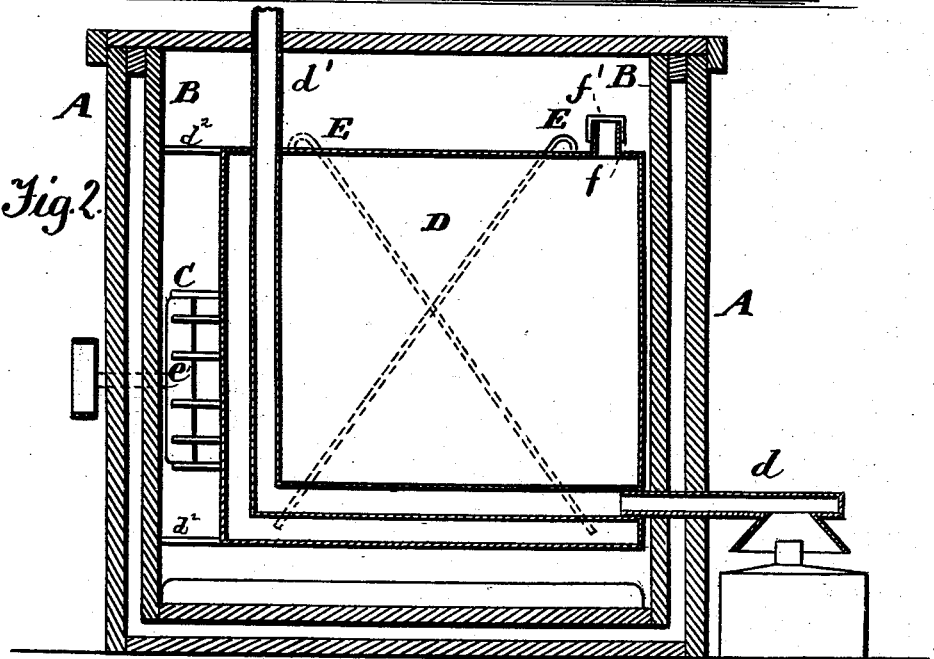
Figure 3:

Figure 1 of the drawings is a vertical section; Fig. 2 a transverse section of the hot water heater and box; Fig. 3 a detail view of one of the egg cylinders.

In the drawings, A represents the outer case and B the inner case, the intermediate space forming an air chamber so that the heat will escape if at all very slowly from the inside or egg chamber.

On the inside of the incubator, I journal egg-holding cylinders C preferably in pairs, the two of a pair being placed opposite to each other. Between these cylinders, I arrange my hot water heater D which is made of any good heat-conducting sheet metal and is of small width, but of a depth which will make it project above the cylinders. I employ projections $d^2$ to hold the heater on the pipe $d$ and a little above the bottom of casing, while on the outside of incubator, I use a lamp, or other producer of heat under a reversed funnel formed on a pipe $d$ so that the products of combustion may be guided into a pipe $d$ connecting with a pipe $d'$. In this way, I can keep the hot water in chamber D at a uniform temperature.

In order to dispense with the ordinary moistener pans in incubators, I use the minute pipes E connected near the top of chamber D and open at the lower end of the egg chamber, so that a gradual exudation of moisture will always be taking place.

My egg cylinders C are made of two concentric circles of wire-rods fastened at the ends in heads $e$ $e$ on the central shaft $e'$, the circles of wire being sufficiently distant from each other to afford room for the eggs while the wires in the larger circle are far enough apart to allow the eggs to be pressed through them with the hand without being broken. The eggs have thus a maximum of surface exposed to the surrounding warm air in the apartment. If however it is preferred the wires of the inner circle may permit the eggs to rest upon the central shaft. I prefer that they shall not do so. Each shaft $e'$ has one of its journals extended through the incubator and provided with a hand crank $e^2$ so that the cylinders may be turned from the outside to change the position of the eggs. These cranks may be connected in well-known ways so that all the cylinders in an incubator may be turned by operating one crank. By the use of my cylinders, more eggs may be incubated at one hatching than where they are otherwise arranged. By means of my hinged doors with windows $a$ $a$ on opposite sides or front and rear of the incubator, the cylinders on each side are brought constantly in view as well as the thermometers by which the inside temperature is to be regulated.

Having thus described my invention, what I claim as new, and desire to protect by Letters Patent, is—

1. An incubator eggholder consisting of a cylinder having end-disks, a connecting shaft and wires between the disks to hold the eggs substantially as shown and described.

2. The combination with an incubator hatching chamber, of a hot-water heater D arranged in the middle thereof, a wire-cylinder C on each side of said heater and moistening pipes E extending from said heater as and for the purpose set forth.

In testimony whereof I affix my signature in presence of two witnesses.

AMOS N. JEWETT.

Witnesses:
W. M. MARTIN,
F. E. PICKETT.